United States Patent [19]
Smith

[11] 3,805,817
[45] Apr. 23, 1974

[54] SEWAGE FLOW CONTROL SYSTEM
[76] Inventor: Sterling F. Smith, 2508 Queens Chapel, Hyattsville, Md. 20782
[22] Filed: Dec. 13, 1971
[21] Appl. No.: 207,159

[52] U.S. Cl. ................................. 137/8, 137/236
[51] Int. Cl. ............................................ F17d 1/12
[58] Field of Search ............ 137/236, 13, 8; 302/35; 61/10; 210/171

[56] References Cited
UNITED STATES PATENTS
| | | | |
|---|---|---|---|
| 3,599,832 | 8/1971 | Smith | 302/35 |
| 2,821,205 | 1/1958 | Chilton | 137/13 |
| 994,167 | 6/1911 | Koppitz | 251/5 UX |
| 2,958,333 | 11/1960 | Poettmann | 137/8 X |
| 2,012,495 | 8/1935 | Bradbeer | 137/236 X |

Primary Examiner—Alan Cohan
Attorney, Agent, or Firm—Sol B. Wiczer

[57] ABSTRACT

A sewage piping complex is controlled by flow stabilizing stations mounted in a series of sections, each including means for constricting and means for accelerating flow to maintain selected pressures and flow rates in the controlled sections, whereby to obtain maximum use of the cubical volume of the piping complex to maintain the piping full of fluid to provide overall even flows of sewage during both normal peak and low volume flows, providing a sufficient internal piping pressure to inhibit ground water influx.

21 Claims, 8 Drawing Figures

INVENTOR
STERLING F. SMITH
BY
Sol B. Wiczer
ATTORNEY

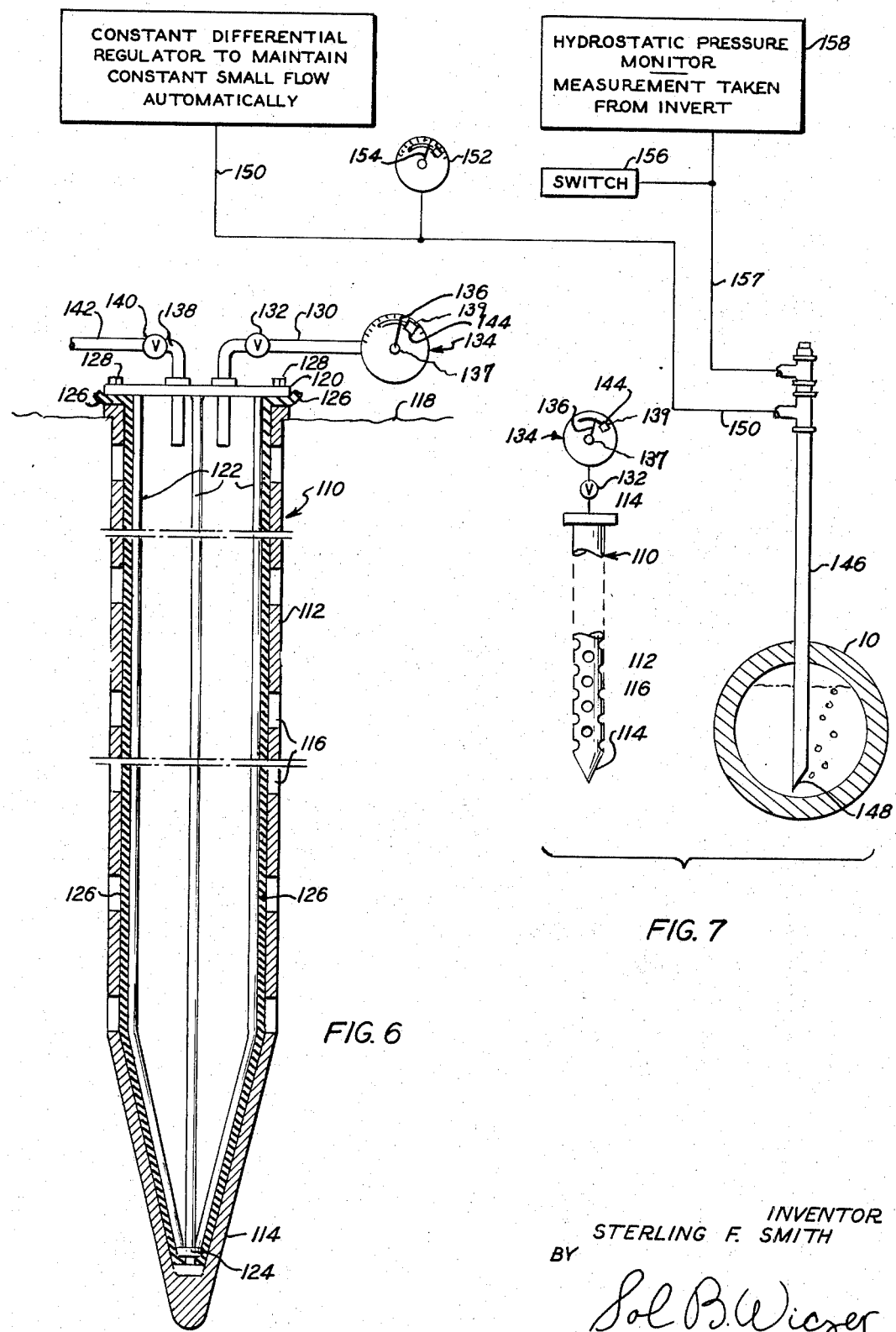

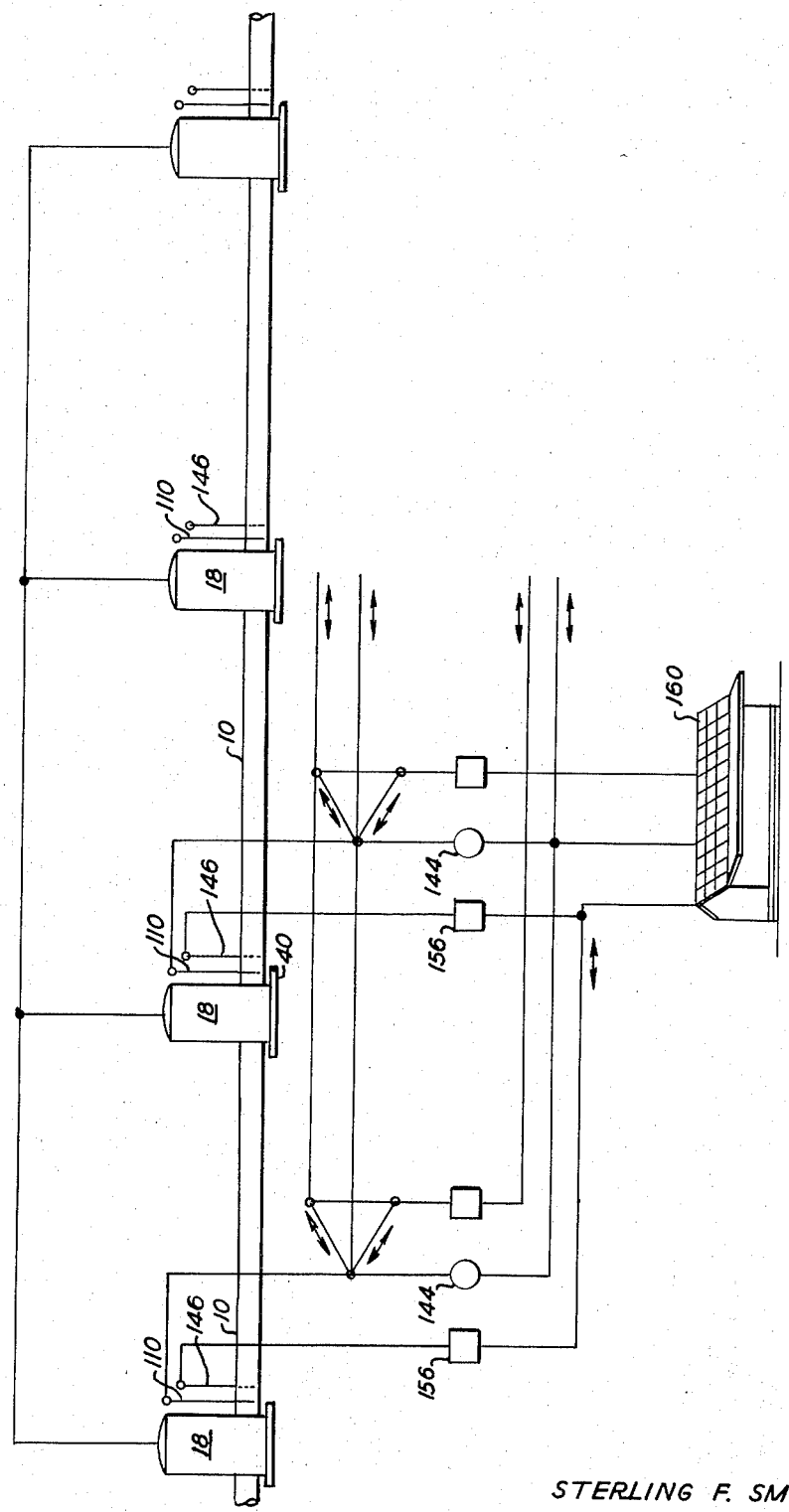

SEWAGE FLOW CONTROL SYSTEM

The invention relates to a sewage gathering system, either exclusively sanitary or combined to include surface or storm water, including method and means for controlling garvity flow fluid transport to a disposal point, such as a sewage treatment plant. More particularly, the present system provides control of the internal pressure and sewage flow rate through a piping complex in a manner to fully utilize its available cubic volume as a storage facility, accelerating and retarding fluid flows therethrough to best handle peak and low loads, while continuously inhibiting ground water intrusion into the system.

In overall operation of the sewage transport system of the present invention, a hydraulic imbalance is established in the sewage piping complex providing an internal hydrostatic pressure within limits, usually exceeding that of the ambient ground water, and using the sewer piping capacity as a reservoir to store peak fluid flows as supplied under peak flow conditions, controlling the fluid flow to the disposal point by accelerating flow in some pipe sections and retarding flow in others, thus to maintain a relatively even flow as needed up to the design capacity of the piping complex and treatment plant.

A sewage system usually comprises a main trunk sewage transfer line, including branch lines or laterals joined thereto, spaced and disposed to handle the sewage flow transfer needs of an area. Such system is plagued by many flow variables resulting from irregular ground water seepage into the lines, original design defects, as well as wear, corrosion, ground shifting and settling and disrepair over long periods of time. Any sewer main trunk and its lateral piping complex may carry large quantities of ground water seeped into the line irregularly, depending upon the recent incidence of rainfall and tidal flows. Sometimes a community grows only by adding sections and laterals under conditions of short-sighted economy, evolving a piping complex undersized or inadequate for peak flow conditions.

Normal sewage flow in a populated area, moreover, is subject to peak flow conditions, twice daily, such as from 5 to 10 a.m. and 5:30 to 9:30 p.m., each then leveling off to moderate flows in a normal 24 hour span, between which high flow periods the fluid flow quantity may be very low. Again, some portions of the system are subject to large flow at lateral junctures, particularly where several laterals may join the main trunk at close pointS. A main trunk is usually designed to accommodate a flow of some 2 to 2 ½ feet per square second in normal grading, but through certain areas wherein hard rock may have been encountered, including prohibitive expense to cut through that kind of ground condition, the sewer pipe may have been installed in a relatively flat or low grade, reducing the normal rapid sewage flow through that low grade cut.

Installation of sewage lines usually follow the normal drainage low level contour of an area, descending from high to low disposal water level areas and so, too, does the porosity of the earth vary from high to lower drainage levels following that of the sewer line. Consequently, ground waters tend to surround the sewer lines and may assert substantial hydrostatic pressures to infiltrate sewer lines, depending upon climatic, i.e., rainfall, as well as tidal conditions near bodies of water. Over the years the sewage piping of cement, ceramic or metal may have become damaged by separation or cracking, and even by settling and may separate at the joints, a process greatly accelerated by the presence developed at low flow conditions of corrosive sewer gas. During a low sewage flow period such ground waters sometimes under substantial hydrostatic pressures, tend to enter the sewage lines, causing them to serve for ground water drainage as much and often more than for sewage transportation. That problem while serving to remove ground waters from lower areas, interferes with the total design of the system to transport sewage according to the design capacity for the total area which it is intended to serve.

Sewage treatment facilities need to be designed to handle both sewage as well as the usual large infiltration of ground waters, and often will become overloaded beyond their design capacity to handle the normal sewage flow at peak sewage flow and infiltration periods where the sewage liquid transported is highly diluted by ground waters. Such ground water infiltration is not merely more fluid to be transported by the sewage piping complex, but rather becomes more highly contaminated sewage water that needs to be handled and purified at the sewage treatment plant.

In broadest overall object the present invention applies controls to a normal gravity sewage flow system whereby the fluid flow will be constrained to fill at least some of the main piping lines to a controlled internal pressure, offsetting the surrounding ground water pressure and thereby inhibiting large inflow and sewage water dilution by ground water and providing a large, even fluid supply for flow of undiluted sewage to a treatment plant.

According to another aspect of this invention the flow through a sewage line is constricted by suitable flow constricting means restraining the fluid flow therein to cause the sewage line to become substantially filled, building at least in select portions of the line a storage supply of the sewage fluid, whereby it may be flowed at a controlled rate downstream in substantial volume, providing in itself a storage reservoir or sewage in quantity useful to treat it according to the design capacity of a sewage treatment facility downstream. Such constricted flow stores the fluid in the trunk line; and if need be, lateral sewage line sections connected thereto, in quantity to provide a sufficient back pressure to largely offset any tendency of the ground waters to seep into the sewage line and substantially dilute the same.

In a further aspect of this invention, several flow constricting means are disposed, each in a series at suitable points along the sewage line, dividing such sewage line into control sections, each section being independently controlled both as to the quantity of liquid that will be stored therein, as well as the fluid pressure and flow rate. Such control includes means to accelerate the flow through each section, reducing the pressure therein and means to constrict the flow to increase the pressure, the several sections being desirably integrated for co-operative flow in a series from one to the next, whereby variable pressures in the several pipe sections are possible and no pressure will exceed the particular limits of the lateral lines connected thereto to interfere with normal sewage drainage therefrom.

In still a further aspect of this invention, each of several of the constricting means are combined with several flow accelerating means whereby to accelerate the flow while releasing flow constriction at one or several constricting points, whereby to increase the flow of one or more sections independently and usually serially, the entire flow system being composited into a system for flowing sewage at optimum capacity of the line, independently of peak conditions of sewage supply to the line, and at an internal pressure to offset the tendency of the ground water to flow into the pipe under the variable climatic or tidal conditions of the area being drained.

Thus, according to the present invention, an even flow of sewage, resulting in better utilization of available sewage flow piping as well as sewage treatment capacity, is achieved by emplacing flow control elements in several sections of the sewage transport system. Such control elements will either restrict the flow of sewage to fill all or only some sections of the system or will accelerate flows in such sections as needed. When the pressure within the sewage line or a section thereof builds up, as would be normal at high flow times, sufficient to exceed a selected maximum, the restriction of flow is released. The flow then may be accelerated for positively increasing the flow rate through an entire line control series, or any one section of the sewer line.

In general the pressure at any one section is a preselected differential between the inside of the pipe and that of the surrounding ground water, selected to maintain a positive excess of pressure in the pipe, modified by a safety factor and the overall hydrostatic pressure at that point in the system.

The minimum flow pressure is achieved preferably by constricting means responsive to a pre-set pressure to restrict the line flow until a back pressure upstream of the control point exceeds a minimum pressure. The increased rate of flow is preferably achieved by pumping fluid at accelerated speed such as by strong fluid jets into the sewage stream to accelerate the flow, that acceleration being applied at a time and to a degree sufficient to reduce the pressure in the sewage line or a selected section below a selected maximum. Thus the pressure and flow rate in the sewage line is held within an optimum pressure range to a controlled flow rate through the several sections.

A suitable sensing device measuring the ground water pressure at various points about the sewage flow pipe may be set to sense the minimum pressure flow to which the flow through the pipe will be restricted until that minimum is achieved. Other sensing devices may be emplaced into the sewer water flow within the pipe to sense the pressure therein for flow control.

The system is further described with relation to the drawings wherein:

FIG. 6 is a detail of a pressure sensing means mounted in the earth about the outside of a sewer line to sense the external ground water pressure;

FIG. 7 is a detail illustrating a pressure sensing means mounted within a sewer line; and FIG. 8 illustrates diagrammatically an overall monitoring system for a series of control stations.

Figure 5:
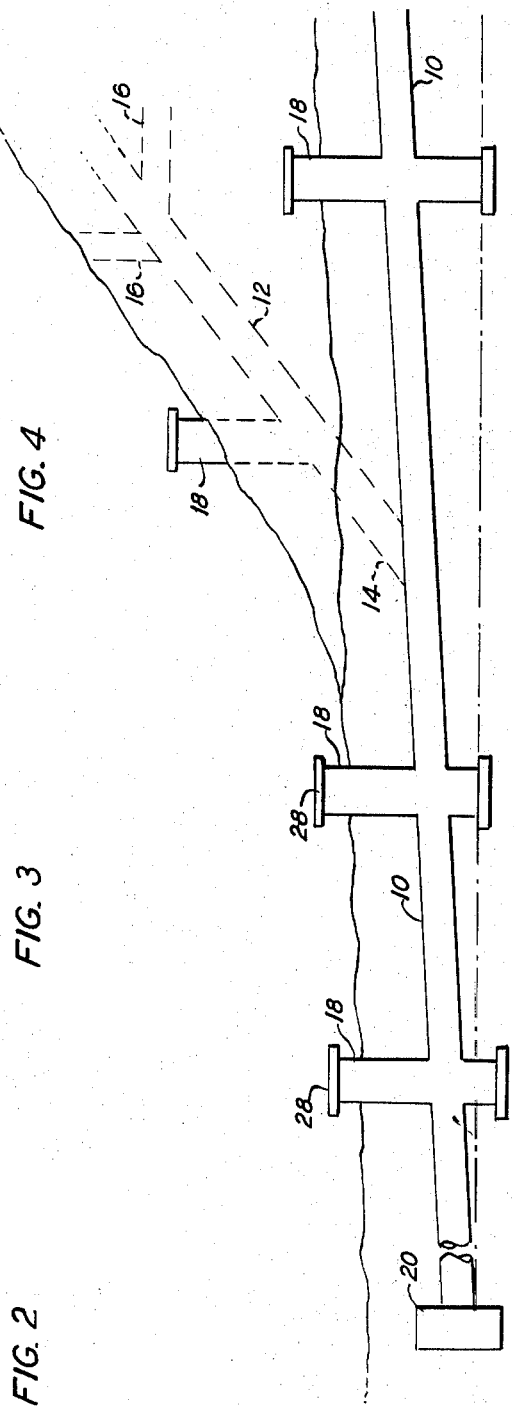
FIG. 5 is a detail illustrating a main trunk sewage line having several control stations thereon including a lateral line and a control station thereon.

Referring first to FIG. 5, a main trunk sewage duct 10 often has one and sometimes several lateral sewage ducts 12 connected thereto as at 14. The lateral duct itself connects to smaller laterals 16 which join or comprise neighborhood sewer lines in the vicinity of the main trunk line 10. The main trunk line 10 is subdivided into short lengths such as 500 to 2,500 foot distances, but averaging about 1,000 foot spacings in which flow control stations 18 are disposed along the main trunk line at more exactly selected intervals as needed. Where there is much duct branching and where needed for other reasons, a lateral 12 also may have one or more control stations 18, controlling the flow therethrough as will appear. The sewage system main trunk line 10 usually terminates at a disposal point 20, typically a sewage treatment plant.

Figure 1:
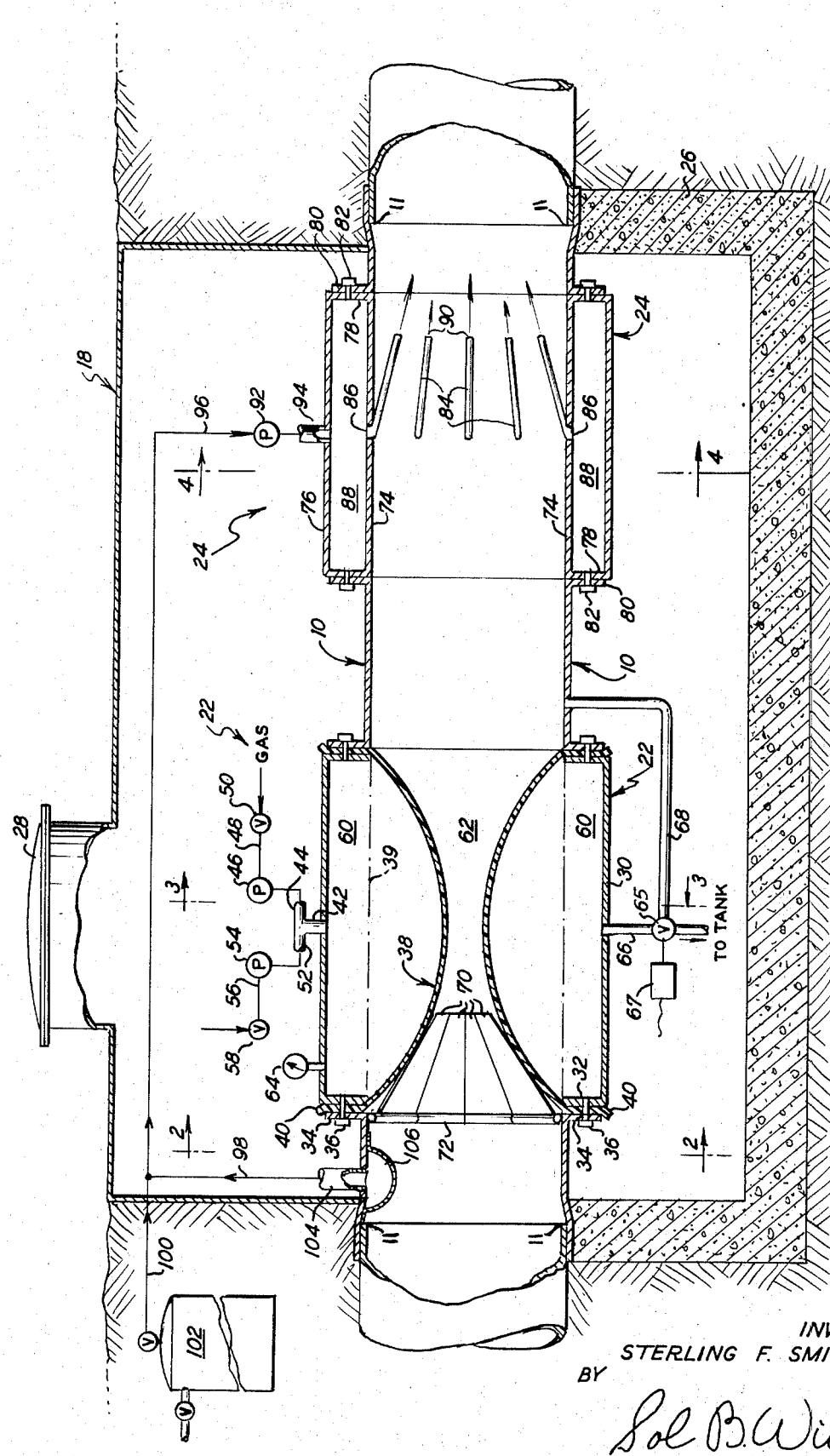
FIG. 1 is an elevation in section of a modular flow control station.
Figure 4:
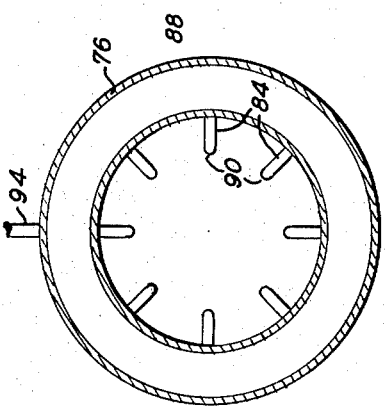
FIG. 4 is a section taken on the line 4 — 4 of FIG. 1.
Figure 3:
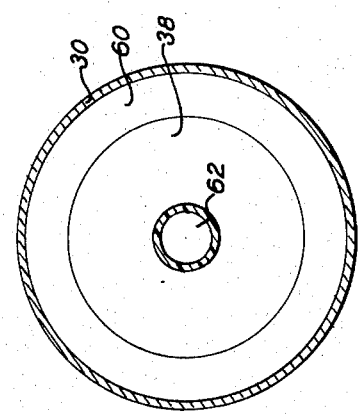
FIG. 3 is a similar section taken along the lines 3 — 3 of FIG. 1.
Figure 2:
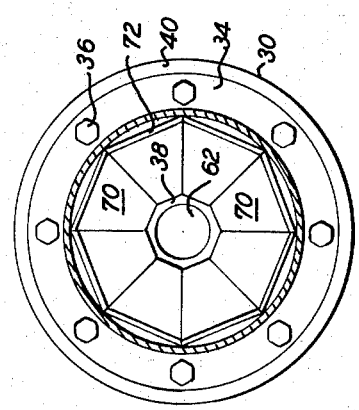
FIG. 2 is a vertical section taken on the line 2 — 2 of FIG. 1.

Referring to FIG. 1, the system includes constricting means 22 and accelerating means 24 both being disposed within a module 18. Each of the constricting and accelerating means has flanges 32 and 78 respectively for union with flanges 34 and 80 of the main flow line 10 of the sewage duct system. The constricting means 22 and the flow accelerating means 24 are disposed, together with other control elements — valves, gauges and the like — within a control station 18 which may be formed by concrete or brickwork 26 on the site. Such module 18 shown in FIG. 1 and in diagram outline in FIG. 5 is emplaced in the earth surrounding and extending beneath the level of the main sewer line 10. The control station may be a preformed module having the several elements mounted therein ready for interconnection into a sewage line such as by welding at 11. The upper end of the module is shown in FIG. 5 diagrammatically as merely a manhole cover 28 allowing surface communication with the station 18 for inspection, setting and adjustment of control means. The several stations 18 as indicated are at various levels as the sewer line descends with the ground surface contour as shown in FIG. 5, the general grade being variable to effect a flow rate from about 2 to 2 ½ feet per second according to common engineering practices; some sections being at relatively steep grades and others more moderate, sometimes leveling off at short sections to a substantially flat grade where, for instance, hard rock may be encountered. Consequently, each of the stations 18 are disposed at a progressively higher level to correspond with the sub-surface position of the sewer line at that point.

While the control stations may be spaced within the range stated above, typical spacing would be 1,000 to 1,200 feet, where no irregularities are present in the line; but it is sometimes useful to place a control station 18 near the juncture of a main line 10 with several important laterals 12 for special control as needed at that specific point, dictated by the needs of the system.

The constricting means 22 may be a body of slightly larger diameter than the main line 10 having an outer cylindrical wall 30 with flanged ends 32 which may be bolted to the correspondingly sized flanges 34 on the pipe 10 by bolts 36 extending through the ends 40 of a cylindrical diaphragm 38 of flexible material such as rubber. Thus a diaphragm 38 has its cylindrical ends 40 securely bolted in fluid-tight manner between the flanges 32 and 34 for securing each of its annular ends. In normal undistended (open-flow) position, the inner walls of the cylindrical diaphragm 38 lie in the cylindrical dotted line position 39 as shown in FIG. 1.

The upper end of the cylindrical wall 30 communicates with a pipe 42 branching into a T, one branch 44 of which communicates with a pneumatic pump 46 and thence through a line 48 with any source of gas usually under high pressure, controlled by a valve 50. The other end 52 of the T joined to duct 42 communicates with a pump 54 and thence by way of line 56 with a source of liquid controlled by a valve 58. In this manner fluid, either gas or liquid, may be pumped by way of line 42 into the space 60 between the diaphragm 38 and the cylindrical wall 30 of the flow control means 22. As fluid under controlled pressure is passed therein the diaphragm 30 bows conically inward to the arcuate shape shown by the diaphragm position 38, constricting the passageway 62 of the main sewage flow in line 10. The constricted flow in main duct 10 by the inward bowed diaphragm 38 may be to any pre-selected pressure and flow rate as indicated by a gauge 64 which may be mounted at any point where it can be observed easily and not necessarily as shown within the control station 18. It may be disposed with other gauges, for instance, at some other point where the total system can be observed by an operator, each gauge connecting with a space 60. A valve 65 is mounted at another position of the annular wall 30, such as at the inverted end of the wall 30 serving both to control the removal of fluid or gas from the chamber 60, withdrawing the same by way of line 66 and passing the same outside the system for disposal by way of line 68, such as returning it to the main sewer line 10 or, non-critically, for disposal elsewhere. The valve 65 may be such as to operate with a preset limit to maintain a fixed minimum pressure or to be practically variable between these pressures as will appear by manually resetting to discharge fluid at a selected pressure, thereby to release the fluid within the chamber 60. Upon release of the fluid in chamber 60, the diaphragm 40 returns to the unrestricted dotted line position 39, thus freeing the passageway 62, either for full sewage flow through line 10 or to some imtermediate point therebetween according to the pressure release valve 65. The valve 65 is of a type which can be remotely controlled for full or partial release of fluid from the chamber 60, as desired. While, as shown, the diaphragm 40 will be pressed by fluid in chamber 60 to merely constrict the flow at 62 to a desired minimum flow, as most usually needed for operation of the system, it will be possible for meeting extreme conditions and using greater pressures to completely stop the flow in duct 10.

A series of protective vanes 70 are mounted radially from hinges 72 about the inlet end of the diaphragm 40, swinging lossely upon the hinges 72, and usually being deflected downstream according to the sewage flow current; and with any substantial flow the vanes are moved along with the current to the inner hinged position as shown in FIG. 1 to lie protectively against the surface of the diaphragm 40, protectively reducing the abrasion effect of suspended sewage tending to erode or destroy the flexible diaphragm. It will be understood that the hinge plates 70 act as an armoring or plating protective of the soft diaphragm, usually rubber or flexible plastic material, against damage by suspended solid particles carried by sewage in sometimes substantially high velocity flow.

The fluid flow accelerating means 24, as shown in FIG. 1, comprises an inner duct 74 and an outer duct 76 usually concentrically cylindrical and joined together by annular end walls 78. These end walls 78 lie parallel to flanges 80 of the duct 10 and, while enclosing a chamber 88, allow for securing the device to the flanged ends of the pipe 10 by bolts 82. An annularly disposed series of jet tubes, nozzles or pipes 84 have their inlet openings 86 communicating with the jacketed space 88 between the annular walls 74 and 76. These tubes 84 receive fluid therefrom under substantial pressure and pass the same angularly downward and outward at points 90 disposed within the pipe 74 in a ring of fluid jets concentrically inward of the annular confining wall 74. Thus the tubes 84 take liquid from the chamber 88 and transfer it as a ring of annularly disposed jets through outlets 90 inward of duct 74 and angularly downstream and at a short angle of some 10° to 30° from the cylindrical wall in a direction to converge toward the center of the pipe 10 from annular wall 74. These liquid jets are expelled in high velocity flow as maintained by a pump 92 communicating with the chamber 88 by way of a pump outlet pipe 94; and with a source of fluid supplied to the pump 92 by way of line 96. The pump 92 supplies the fluid to the chamber 88 under substantial pressure to expel the fluid in a series of jets emitted from outlets 90. This ring of high velocity and pressure liquid provides an accelerating effect upon the flow of the sewage water in line 10. It also serves to suspend and re-suspend any settled solids in the sewage line 10. Fluid for accelerating the sewage flow by way of line 96 may be taken from the main sewage line 10 through an outlet pipe 98 positioned upstream of the constricting means 22. In some cases where the sewage has such high concentration of suspended solids, it is not practical to pump such sewage fluid as a series of jets because the solids may block the pump rotor or lines or jet lines 84. The fluid for the jets may then be alternately taken by way of a line 100 from separate storage tanks 102 which may be mere subsurface wells or other supply sources for fluid connected by pipe 96 to supply the pump 92.

In another alternate, the outlet 104 from sewer trunk line 10 into line 98 for passage of fluid to pump 92 for forming the flow accelerating jets may be protected by a screen 106 in the main sewage line 10 to prevent the passage of solids into the line 98 and to avoid clogging of the fluid passageway to the pump 92. Such screen is shown in FIG. 1.

The pressure of the ground water is measured by a pressure sensing device 10 as shown in FIG. 6. The device is a long tube, usually metal, having an outer cylindrical wall 112, with the bottom 114 tapering to a point, whereby it is easily driven into the ground. It is usually positioned at a level with the point about the same or a few inches above, the concave or invert bottom of the sewer line 10; that is, to measure the approximate hydrostatic pressure of the ground water at that point. The cylindrical walls 112 of the tube are perforated by holes or slots 116 disposed at many levels to allow free passage of ground water through the tube wall at various levels.

The top of the tube 110 extends above the ground level 118 and is closed by a cap plate 120 such as by bolting to a flange about the annular top. Several long stiffening and support wires 122 are disposed as an annular cage from the plate 120 downward to a point near the bottom 114, and are secured together in a round fastening ring or bracket 124 forming a cage or still wire from having a diameter less than that of the tube walls 112 for easy removal and which is usually supported to depend from the cap plate 120 for insertion and removal. Entrained for support about the supporting wire form 122 is a rubber or plastic sheath forming a resilient diaphragm 126 whose upper annular edges overlap the upper edge of the tube 112 and is secured thereto in a fluid-tight joint by pressure of the plate 120 thereon, usually with small screws or bolts 128. In this manner the resilient sheath 126 is supported as a tubular sheath within the metal tube 112 by the wire cage from 122, so that ground water entering the lateral walls 112 through perforations 116 of the tube press against the sheath or diaphragm 126 for imparting ground water pressure thereto throughout its entire cylindrical surface from top to bottom of the tube 112.

The plate 120 further has small holes bored in the top to receive a capillary tube 130 in fluid-tight fit. The fluid passage through the capillary tube 130 may be controlled by a small valve 132, the inner end of the tube passing through the top of the plate 120 for communication with the inside of the sheath 126. Th outer end of capillary tube 130 passes to a pressure gauge 134 having a dial and indicator arm 136 for recording the pressure of the fluid transferred thereto through the capillary tube 130.

A similarly mounted tube 138 also mounted in a bore in the cap plate 120, and controlled by a valve 140, may communicate at its outer end 142 with a source of gas and at its inner end with the interior of the sheath 126. The dial arm 136 carries an electrical current through wire 137 and may communicate with an adjustably positioned contact switch 144 having a wire 139 so that at a preselected pressure at which the switch 144 is positioned, an electrical current betweeen wire 137 by way of indicator arm 136 meets the contact switch 144 and is completed to wire 139. Fluid flow, responsive to the pressure of the ground water as indicated by gauge 134, is thus controlled.

In operation, the ground water pressure sensing device is pressurized to a constant initial atmospheric pressure by first passing gas through capillary 142 from any source of pressurized gas, valve 140 being opened and the gas is then passed through capillary duct 138 to inflate the diaphragm 126 to approximate atmospheric pressure as indicated by dial arm 136 on the gauge 134, valve 132 being open. When the pressure sensing device is driven in to the proper level in the ground, the entering ground water through perforations 116 pressing against the diaphragm 126 will press the arm 136 by the pressure of gas through capillary 130, thus causing arm 136 to indicate the ground water pressure at the level of the tip 114. By suitably calibrating the gauge 134 the dial arm can be set against a switch contact 144 to close an electrical circuit at a pre-selected ground water pressure, whereby to allow the system to be controlled to the extent desired by pressure generated by the ground water at the given level.

As shown in FIG. 7, a second pressure sensing device is mounted within a main trunk pipe 10 and comprises a tube 146 having a tip 148 disposed a few inches above the concave or invert level of the pipe 10 to measure the pressure of the water within pipe 10 at that point. Such level is the same as that of the tip 114 of the externally mounted ground water pressure sensing device 110. A constant differential regulator maintains a constant small gas flow in line 150 at a pressure indicated by a gauge 152. The capillary enters the sensing tube 146, passing down centrally thereof to the bottom 148 emitting the constant flow of gas as a stream of bubbles against the sewage pressure. Since these bubbles have a pressure sufficient to overcome the hydrostatic pressure of the fluid within the pipe 10, it becomes a measure of that pressure by that constant small flow which is measured and indicated by the gauge 152 having a dial and movable arm 154 from which the pressure in line 150 and sewer pipe 10 can be visibly read by the operator. A pressure sensitive switch 156 is activated by a second capillary tube 158 communicating with the pipe 146, and may be manually set to close the circuit at a preselected pressure and pass the signal to a hydrostatic pressure monitor 158 according to the pressure measurement taken from the lower end 148 of the tube 146.

In this manner the pressure within the pipe 10 is measured by the constant flow of gas through capillary 150 from dial 154, and the operation of the system may be made responsive to a pre-set pressure by adjustment of switch 156 to complete an electrical circuit when a pre-set pressure is reached. Thus the pressure of the ground water outside of the pipe 10 and the pressure of the fluid within the pipe 10 may both manually be set to signal selected pressures and may thus be used as controls for the system. Such controls may be mounted as dials within control station 18 for manual setting by an individual operator of each control station 18, applying such adjustment for each control stage of the sustem as needed for selectively controlling pressure for operation of the system. All of the controls from several stations, however, may be fed as signals into a single master control panel for manually or automatically controlling the entire sewage flow control system hereof.

Such master control system is shown in FIG. 8. It comprises several control stations 18 through which passes a main sewage flow pipe 10. A pressure sensing device 146 controls a switch 156 operative as described above to sense the pressure within a main sewage line 10. An external ground water pressure sensing device 110 is mounted to the same ground level and controls a switch 144 as described above. Each switch is pre-set to a selected pressure to be sensed, the internal pressure switch 156 being pre-set to a pressure higher than that of the external switch 144.

The pressure signals obtained at each station 18 are fed into an operating console 160 for which the operator can monitor the full control means centrally for each and all of the sensing stations 18, integrating the total system by setting each station to a selected pressure. In the control diagram of FIG. 8, the master control can take over from individual controls, operating each unit 18 from a central control point to send signals up and down the piping complex, setting each station to the pressure and flow rate needed. However, since each unit can be separately controlled, the entire system may also operate as a composite or resultant effect of individual station controls. The system using a single control center operated automatically or manually is preferred.

The main trunk sewage line and laterals, filled with sewage water, will offset the inflow of ground waters becase of balanced pressures thereagainst due to the filled pipes even under conditions of high ground water pressures. The filled sewage lines allow a regulated, substantially constant flow of sewage water to the processing plant at about or slightly below its design capacity. The net effect is substantially constant volume operation of the sewage treatment system with greater efficiency, and often requiring less overall capacity for the same quantity of sewage to be handled from a given area by simultaneously cutting out the need for treatment of large volumes of ground waters.

By constriction of a flow control diaphragm 40, a short section may have its flow constricted while a neighboring unit is having its flow accelerated, not only relieving pressure by the accelerated flow of the neighboring section, but often also to allow that neighboring section better to service its lateral lines where overloading is present. As first indicated, a wide variety of conditions often need to be and can be accommodated by this highly flexible system.

In a sanitary or combined sewage system the total fluid flow is intended to pass to a sewage treatment plant. Thus its design capacity, at least originally, is such as to accommodate both the original sewage piping system emplaced as well as the ground water influx. That sewage handling plant, however, can be supplied with a sewage flow at close to maximum design capacity when large flow supply of sewage occurs, usually in the critical hours of 5 to 10 a.m. and then at a somewhat lesser rate at 5 to 10 p.m. The other hours of the day outside of these peak flow points handle a sewage flow to the plane which is well below the design capacity.

Restriction of the flow in a section by the restricting means usually will be set at the relative minimum because, as the stored quantity of the sewage into the system tends to build up, the pressure on the system builds up correspondingly. Thereafter restriction to flow will usually be reduced only enough to allow the flow to be stabilized section by section while maintaining substantial volume in storage, and certain sections, usually those downstream to the treatment plant, will have their flow accelerating means operated as needed substantially to increase the flow sufficient to accommodate the increased volume of sewage that needs treatment. Much of this increased flow will be gradual as the supply of sewage increases, and more of the fluid corresponding to the influx of sewage at the peak hours will be treated and less of that already stored. Overall a relatively constant flow will be maintained substantially automatically even under external conditions of large rainfall or high tidal conditions in coastal areas where ground waters even at high pressure surround the sewer lines because the system will be substantially freed of ground water influx.

In operation of the present system the control stations 18 are each placed the selected distance, such as a thousand feet apart. The constricting means 22 is acutated in response to a low pressure signal such as the incomplete circuit through switch 156 to constrict so as to substantially fill the system upstream to one or several sub-stations. The pressure needed to maintain the constriction in each substation is varied according to the hydrostatic pressure within the line 10 at each sub-station. The pressure downstream obviously would need to be higher in actual hydrostatic pressure value than the adjacent station upstream therefrom to accommodate the lower level hydrostatic condition. No hydrostatic pressure point will be allowed to exceed the practical value needed to accomodate flow from its laterals. The ground water pressure surrounding each control station point, however, may be set to operate as a limit or modifiying control whereby the internal hydrostatic pressure within a pipe at a particular substation needs merely to exceed the ground water pressure at that point by a small value of, for example, one pound per square inch, usually in the range of about 0.5 to 10 pounds per square inch.

A preliminary operation on start up of the system will be to constrict the flow of each section in a series first to fill several of the sections sufficient to develop a back pressure within the pipe 10 to a point about equal and preferably slightly more than the pressure of the ground water in the area of each section. This is done by pumping liquid or gas under pressure into the constricting means chamber 60 whereby the sewage fluid flow in each section is reduced, building up enough of a back pressure in each section substantially to fill the section to a pressure at least equal to and preferably slightly exceeding that of the surrounding ground water. In this respect the sewage line will represent a storage chamber for accumlating a substantial volume of sewage, sufficient to form a body of fluid for ultimately feeding to a sewage treating plant at a relatively constant rate. After several pipe sections or all of them are substantially filled to the desired pressure at least to offset infiltration of ground water, the section or sections downstream closest to the sewage treatment plant then has its constriction means reduced to increase the flow of the sewage water to the treatment plant to a desired intermediate preselected flow rate i.e., preselected to a reasonable value below the design capacity of the sewage treatment plant, such as some 60 to 70 percent of the normal flow and treatment capacity of the system as it was originally designed, and the system is then adjusted for each control station desirably to maintain such flow rate relatively constant. The flow rate thus will be maintained at a relatively constant intermediate point below maximum design capacity with the constrict means at each control point reduced to allow the hydrostatic pressure at each control point merely to slightly exceed its ground water pressure. Where a high volume of sewage load needs to be handled at a peak load time is present, the constriction and the pressure at one or more stations may be reduced and the flow thereby increased. That process of reducing the pressure may include releasing the constricting means and accelerating the flow by pumping to drive water as sewage jets at high pressure of from 400 to 500 psi to actuate the acceleration at the station point, increasing the flow at that point and thus more rapidly relieving the hydrostatic pressure at the selected point as well as at other points downstream and upstream. In general the flow will be stabilized to a relatively overall constant rate that is optimum for the ultimate treatment facility to handle the total community sewage transport needs over a daily or other fixed period.

It will be evident from the description above that constriction of flow in one or more sections will cause the sections and usually sections upstream and downstream thereof to become filled or substantially filled with fluid sewage. Sewage systems ordinarily are designed to accommodate the sewage influx from numerous points from which the sewage is gathered. The fluid is drained by gravity to the disposal point including a sewage treatment plant. The installation of control stations at selected points will cause the total system or a portion thereof to operate as a series of coordinated control points to stabilize the flow of a relatively even or constant fluid supply of fluid sewage to the treatment plant. The constriction at these points causes the system to partially fill with fluid as a storage reservoir for peak loads and releasing of these constrictions in the control stations allows the sewage to flow relatively even at a selected rate up to the maximum design capacity of the system when the system has been filled.

It will be evident, moreover, that the accelerating effect of the several jets installed at each control station allows the overall flow to be accelerated at these points even more than a normal quantity flow rate beyond the design capacity, and particularly downstream of any control station that is restricted, the hydrostatic pressure will be lower, and this has several immediate results. A first is that a supply of fluid is made available which can be flowed even at the maximum design of the piping system or any pre-selected lower optimum or useful rate to the disposal point of the sewage treatment plant. The outstanding advantage is that selecting a point lower than the maximum design capacity allows establishing and maintaining a relatively constant flow rate to a sewage treatment plant with the obvious advantages therein. A second advantage is that at heavy peak periods the design capacity of the total system can be met by the flow rate and even exceeded by the accelerating effect of pumping to the control stations arranged in the series. Finally, and most important, the system is desgined to operate with the several sections of the transport line under a pressure which will exceed the surrounding ground water pressure, whereby there will be no influx of ground water to dilute the normal volume of sewage which must be disposed of by the sewage transport system. At periods of heavy rainfall or high tides when the ground water pressure is greatest, the pressure within the system can be adjusted to exceed this maximum. Similarly, the pressure within the system can be lowered to any useful value preferably one for even flow useful for handling the entire sewage input at a preferred relatively constant flow rate and an internal pressure. There are other incidental advantages. For instance, at a point of high lateral input it is often useful to operate at a somewhat higher flow rate to accommodate the larger flow at that point than at other points upstream.

The following example illustrates the practice of this invention:

Several flow stations "A," "B" and "C" are arranged selected within a broad range of 500 to 2,500, arbitrarily 2,000 feet apart on a main sewage drainage trunk pipe four feet in diameter by operating a constricting means as shown in FIG. 1 in each section. The pipe in start up is in full flowing condition. At a sensing point 6 inches above the center of the invert of the pipe, the measurement to the crown pipe being then 3.6 inches, the pressure on the gauge multiplying the 3.6 times 62.5 (the weight of 1 cubic foot of water) and the volume by 144 [the volume of a cubic foot], the hydrostatic pressure at that point would be 1.518 psi. The pipe is emplaced twelve feet below the surface, whereby the ground water pressure would be twelve ties 62.5 divided by 144 or 8.01 psi. This is the ground water pressure of the initial station "A." At a point 2,000 feet downstream of this pressure point, that is, the next control station downstream, interconnected by a grade of 0.05, and adding the increased hydrostatic pressure derived from the upstream station, the total hydrostatic head is 12.6 inches inside the pipe, and, consequently, the pressure within the pipe has increased to 5.8 psi when the hydrostatic head of the fluid extending 2000 feet upstream is added. Consequently, for the initial "A" station the initial control settings of the station are 8.01 psi for the surrounding ground water and 5.8 psi for the interior hydrostatic pressure at that point. The station 2,000 feet upstream or the "B" station would be reduced by the hydrostatic pressure factor and the ground water at that point will be 6.1 psi and the interior hydrostatic pressure is 6.7 psi. In the opposite downstream direction a station "C" would have an interior hydrostatic pressure of 7.2 and a ground water pressure of 5.8. These pressures are the initial control limits at which the system may be set in operation. For purposes of control, however, additional control points for setting of the control switching means are selected as limits for operation of each "A," "B" and "C" control station such as intermediate points and maximum points. Obviously the maximum points are arbitrarily higher and are set by a so-called built-in safety factor; and the intermediate points are also higher than the initial control point, but are less than the maximum.

The following table sets forth initially calculated and higher control points:

|  | A | | B | | C | |
|---|---|---|---|---|---|---|
|  | Hydrostatic pressure | Ground water | Hydrostatic pressure | Ground water | Hydrostatic pressure | Ground water |
| Initial | 5.8 | 8.01 | 6.7 | 6.1 | 7.2 | 5.8 |
| Intermediate | 9 | 11 | 9.1 | 9 | 9 | 8.5 |
| Maximum | 12 | 13 | 12 | 13 | 12 | 13 |

These settings are adjusted one against the other from readings taken under the varying conditions of day to day operation. Adjustments will be made for heavy rainfall and tidal flow. However, the upper limit of hydrostatic pressure which is developed in the study of the data base must be maintained. The controls are interlocked from station to station throughout the system and a sequence of operation from control to control is programmed to maintain the condition of hydraulic imbalance to insure against the infiltration of ground water and steady state operation of the treatment plant. This sequence of operation will also have a built-in safety factor which will insure against the build up of pressure within the piping which would cause a "back up" of the sewage content of the pipe into the house connections. This safety factor must be maintained even at the expense of some percentage of ground water infiltration for a few hours. For example to take the extreme case, a section of piping at the low end of the gathering system in a tidal flow area during a heavy rain because of these conditions could build up very high ground water pressure. If the hydrostatic pressure followed this, the consequences could be serious. Therefore, the built-in safety factor comes into play for the period of time the ground water pressure remains excessive. This could be but a few hours during that period during which the tide is a full flood. During this period the intrusion of ground water will be tolerated if necessary.

The entire control system is interconnected electronically into a console at a central point. The operator thereby ascertains at a glance the operating conditions at each flow stabilizing station.

As a further refinement a printer is added to give continuous read-out of the shifting sequence of operations at each station and between stations.

As thus described a sanitary sewage transport system is controlled to effect an imbalance operative to impart a high internal pressure within the piping system than external ambient ground water pressure with a net effect to allow more even flow to the disposal point. The system comprises means for constricting the flow as well as means for accelerating the flow at spaced control sections, whereby the total sewage transport complex may comprise sections wherein the flow in some may be more rapid than normal, and in others, slower than normal, with a net overall even flow through the total system. The peak demands on the system by high normal influx of sewage are reduced by using more of the total piping capacity as a storage means to handle only a moderately high flow. The supply periods of sewage influx are used to handle some of the large stored supply. The internal pressure developed inhibits ground water influx. Hence, the outstanding advantages are that the total necessary fluid handling structure, due to substantial exclusion of ground water influx, provides an apparent greater capacity in that it handles fluid sewage at overall more even flow undiluated by ground water.

Various modifications will occur to those skilled in the art. While as shown the constricting means is preferably a diaphragm, other fluid controlling means may be provided. Again, while it is useful, and preferred, to accelerate the flow by use of jets of fluid and preferably the fluid sewage per se, other pumping means even with extraneous fluid supply to accelerate the fluid sewage flow in the system may be provided.

As described above, the fluid flow to the pumps is screened to remove large suspended particles to avoid damage to the pump or clogging of jets. More elaborate screening means may be provided to form a fluid relatively free of suspended large solids.

Again, the control system may be operated manually, setting the controls for each sub-station for optimum operation of that point, depending upon the demands of the particular neighborhood served by the sewage transport system. The pressure signals for control of each sub-station may further be composited into the master control for the overall control of the entire sewage flow system. Again, while applicant has shown specific pressure sensing devices both for ground water and internally of the piping system, these, too, may be substituted by other known pressure sensing means and serve as controls for the overall system.

Accordingly, it is intended that the foregoing description be regarded as exemplary and not limited except as defined in the claims appended hereto.

What is claimed is:

1. In a fluid sewage transport and disposal system, a piping complex having a substantial portion disposed underground inclined for gravity flow of sewage in said system, and connected to lateral liquid sewage supply and to a sewage disposal outlet, means for sensing the ground water pressure adjacent to selected sections of said system and means for increasing the hydrostatic pressure in said selected sections of said system responsive to the sensed ground water pressure imposing a hydrostatic pressure imbalance in the piping complex, whereby to provide a higher pressure in at least certain sections of the system to a point whereby pressure therein exceeds that of ambient ground water.

2. The system as defined in claim 1 further including means for restricting the flow of sewage at least at one selected point, and means for releasing said restriction to controllably provide a fluid pressure within the system exceeding the pressure of ambient ground water at that point.

3. The system as defined in claim 1 wherein said means for providing a pressure imbalance includes a means for restricting the flow of sewage and a means for accelerating the flow of sewage at at least one selected point and means for sensing the ground water pressure at said selected point whereby to control the pressure and flow rate of the fluid sewage at that point in the system to exceed the pressure of the ambient ground water.

4. The system as defined in claim 3 wherein said means for providing a pressure imbalance includes means for restricting the flow of sewage at several selected points in fluid flow communicating series.

5. The system as defined in claim 4 wherein each selected control point further includes means for accelerating the sewage flow at that point.

6. The system as defined in claim 4 wherein the means for restricting the flow of sewage at the several selected points are each coordinated into a central control for each of the units said restrictive means maintaining a pressure in each exceeding that of the ambient ground water.

7. The system as defined in claim 1 wherein said means for imposing a hydrostatic pressure imbalance in the piping complex include a means for constricting the flow of sewage and a means for accelerating the flow of sewage at at least one point in said system, means in the ground adjacent the piping at that point sensing the ground water pressure and means within the pipe at about the same level sensing the internal hydrostatic pressure within the pipe, and means for adjusting said restricting and accelerating means responsive to the pressure sensed by both of said pressure sensing means to maintain a positive pressure differential between the hydrostatic pressure in said pipe at said point and the ground water level at said point.

8. The system as defined in claim 3 wherein said sewage flow restricting means comprise a flexible annular wall normally sized to accommodate the sewage ducting at that point through which sewage is flowed, a pressure chamber surrounding said flexible wall and means for admitting fluid under controlled pressure to said pressure chamber whereby to bow said flexible wall inward in fluid flow constriction upon the flowing sewage therethrough, and means responsive to the hydrostatic pressure in said sewage ducting within said fluid system for controlling the constricting pressure upon said flexible wall.

9. In a sewage transport piping complex as defined in claim 3 having a flow control station comprising a solid walled housing having a duct inlet and a duct outlet through which a main sewage flow is constrained to pass, said means for constricting the flow of fluid and said means for accelerating the flow of the fluid are disposed in series flow between said inlet and outlet ducts.

10. The piping complex as defined in claim 8 wherein the sewage flow constricting means includes a protective shield disposed about the inlet of said flexible annular wall protectively deflected by the flow of sewage therethrough to prevent abrasion of sewage particles upon said flexible wall.

11. In a sewage transport piping complex as defined in claim 3 wherein said sewage flow accelerating means comprises an annular wall through which the main sewage flow is conducted to pass in normal sewage flow transport, a fluid confining jacket about said annular wall, a series of jet nozzles having their outlets directed angularly inward from said wall toward the center of the sewage flow in the downstream direction with their inlets within said confining jacket, a source of fluid and a high pressure pump accepting fluid from said source and passing the same under high pressure to said confining jacket whereby to impart a series of annular jets into the fluid sewage stream for accelerating flow thereof.

12. The piping complex as defined in claim 11 wherein the source of said fluid for said accelerating means comprises a duct communicating with fluid sewage in the piping system upstream of said pump.

13. The piping complex as defined in claim 12 wherein the ducting communicating with the piping system upstream of said pump is protected by screening to exclude large suspended solids from said sewage fluid being pumped.

14. In a sewage transport piping complex including sewage flow ducting, at least a portion thereof being disposed underground, a sewage flow constricting means in said ducting connected in sewage flow series with sewage flow accelerating means, said sewage flow constricting means comprising a flexible annular wall normally sized to accommodate the sewage flow at that point, a pressure chamber surrounding said flexible wall and means for admitting fluid under controlled pressure to said pressure chamber whereby to bow said flexible wall inward in fluid flow constriction upon the flowing sewage therethrough, and means responsive to the hydrostatic pressure in said sewage ducting within said fluid system for controlling the constriction pressure upon said flexible wall, said fluid flow accelerating means comprising a tubular portion through which the main sewage flow passes, a jacketing housing about said tubular portion, a series of nozzles extending in fluid flow nozzle direction from said jacketing means angularly downward in the direction of main sewage flow, pumping means connected to pass impelling fluid into said jacketing means and thence outward through said nozzles to impell sewage flow in said main tubular portion, a source of fluid supplied to said pumping means, and means responsive to the hydrostatic pressure in said sewage ducting for controlling the flow alternately constricting the flow through said ducting by said fluid flow constricting means and to accelerate the flow through said ducting by said fluid accelerating means.

15. In a sewage transport piping complex, a flow control station, a main sewage duct passing through said control station, means in said main sewage duct passing through said control station for restricting the flow of sewage through said duct, means in series flow of sewage in said main sewage duct passing through said control station for accelerating the flow of sewage through said duct, and means in said control station for controlling said sewage flow restricting means and sewage flow accelerating means responsive to fluid pressures within said sewage transport duct.

16. The sewage transport system as defined in claim 15 wherein said control station is a pre-formed module adapted to be mounted substantially beneath the ground level with surface access to control elements therein and with fluid flow restricting and accelerating means interconnected into said sewage transport piping complex.

17. In a sewage transport piping complex as defined in claim 15, a pre-formed module comprising a flow control station, said station including means for restricting the flow of fluid through a duct and means in circuit with said fluid control means for accelerating the flow of fluid through said duct, and control means in said housing for operating said restricting and accelerating means, said module having open ducting at its inlet and outlet sides for joining inlet and outlet ducting of a main sewage flow system.

18. In a sewage transport piping complex, several flow control stations as defined in claim 15, control section being separated a substantial distance from another dividing the complex into flow controlled sections, and a central control section connected to each control section controlling the sewage flow through the several sections by control of constricting and accelerating means at each control station responsive to the fluid pressure within the pipe near each section.

19. The sewage transport piping complex as defined in claim 15, further including means for sensing the pressure of sewage in said main sewage duct, and means for sensing the pressure of the ground water at about said duct level outside of said duct, the said means for restricting the flow of sewage through said duct and the means for accelerating the flow of sewage through said duct, being responsive to the pressure sensed by said pressure sensing means.

20. The method of controlling sewage flow in a sewage gathering system normally flowing by gravity to a sewage treatment plant, comprising restricting the sewage flow in a hydrostatic imbalance in a series of sections to build up the internal hydrostatic pressure within these sections at least sufficient to exceed the ambient ground water pressures about said sections and forming a reservoir to hold fluid sewage in volume variable with periodic low and high sewage flows into the system, and controllably releasing said restrictions upon flow at least in some of said sections and then accelerating the flow therein to a rate greater than gravity flow to control the overall sewage flow through the system at a selected relatively constant rate to a sewage treatment plant.

21. In a fluid sewage transport and disposal system a piping complex having a substantial portion disposed underground, and connected to lateral liquid sewage supply sources and to a sewage disposal outlet, at least one sewage control station, connecting with the underground piping including means for increasing the hydrostatic pressure and means for decreasing the hydrostatic pressure up stream of said control station imposing a hydrostatic pressure imbalance in said up stream portion of said piping complex.

* * * * *